United States Patent

Stevens et al.

[11] Patent Number: 5,976,646
[45] Date of Patent: *Nov. 2, 1999

[54] VEHICLE TRIM PANEL WITH NATURAL FIBER LAYERS

[75] Inventors: Donald R. Stevens, Marysville; Stuart G. Boyd, North Street; Brian Eagen, Smith Creek, all of Mich.

[73] Assignee: UT Automotive Dearborn, Inc., Dearborn, Mich.

[*] Notice: This patent is subject to a terminal disclaimer.

[21] Appl. No.: 09/032,675

[22] Filed: Feb. 27, 1998

Related U.S. Application Data

[63] Continuation of application No. 08/699,108, Aug. 16, 1996, Pat. No. 5,804,262.

[51] Int. Cl.[6] ...................................................... B32B 5/26
[52] U.S. Cl. ..................... 428/31; 296/214; 428/308.4; 442/55
[58] Field of Search ................... 428/31, 308.4; 296/39.1, 214; 442/55

[56] References Cited

U.S. PATENT DOCUMENTS

| | | | |
|---|---|---|---|
| 4,211,590 | 7/1980 | Steward et al. | 428/138 X |
| 4,291,084 | 9/1981 | Segal | 428/212 |
| 4,363,848 | 12/1982 | Le Duc et al. | 428/317.7 X |
| 5,019,197 | 5/1991 | Henderson | 156/212 |
| 5,056,817 | 10/1991 | Fuller | 428/31 X |
| 5,437,919 | 8/1995 | Welich et al. | 428/317.7 X |
| 5,582,906 | 12/1996 | Romesberg et al. | 428/308.4 X |

FOREIGN PATENT DOCUMENTS

| | | |
|---|---|---|
| 0671259A1 | 2/1995 | European Pat. Off. . |
| 94 09 438 U | 9/1994 | Germany . |
| 2010123 | 6/1979 | United Kingdom ..................... 428/90 |

*Primary Examiner*—Henry F. Epstein
*Attorney, Agent, or Firm*—Howard & Howard

[57] ABSTRACT

An improved material for forming vehicle trim panels includes natural fibers formed reinforcing mats. The natural fibers replaced the prior known use of glass fibers. Prior art glass fibers may sometimes cause skin irritation, and the natural fiber eliminates this problem. The fibrous mats are preferably placed on both sides of the central foam layer, and a decorative layer is placed outwardly of one of the fibrous mats. Various naturally occurring fibrous materials such as hemp may be utilized.

9 Claims, 1 Drawing Sheet

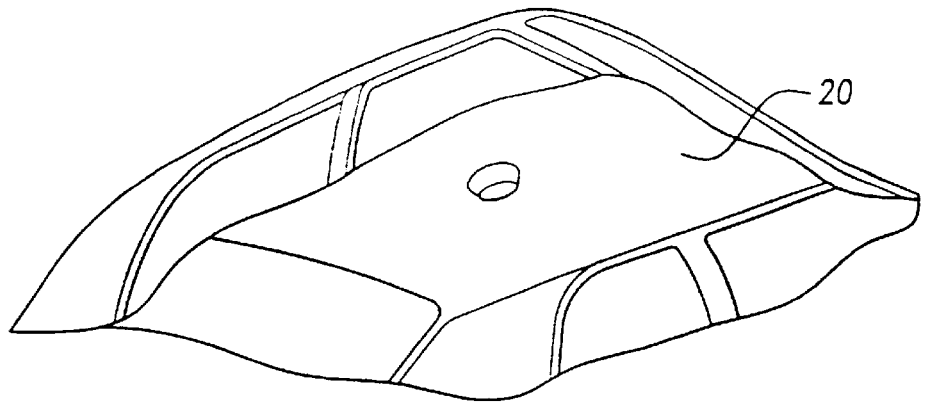
Fig-1
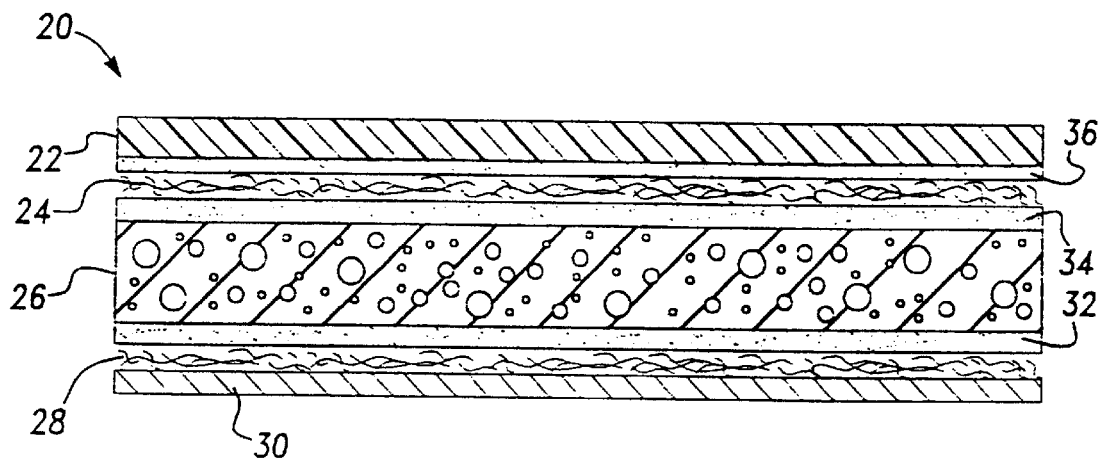
Fig-2
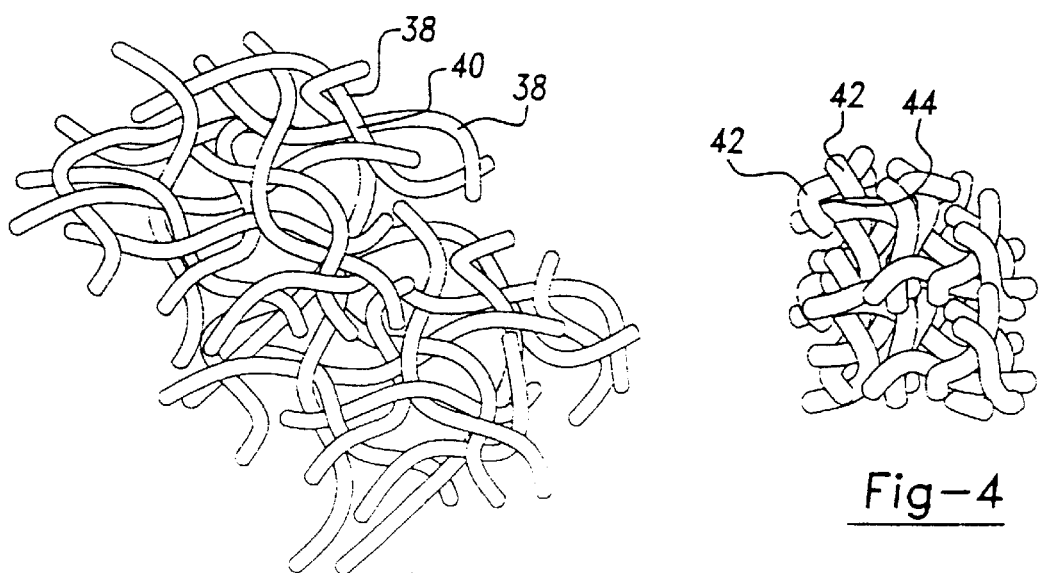
Fig-3
Fig-4

VEHICLE TRIM PANEL WITH NATURAL FIBER LAYERS

This is a continuation of application Ser. No. 08/699,108 filed on Aug. 16, 1996 now U.S. Pat. No. 5,804,262.

BACKGROUND OF THE INVENTION

This invention relates to a vehicle trim panel having a sandwich construction including a central foam layer and fiber mats formed of natural fibers on opposed sides of the central foam layer.

Sandwich constructions including fibrous mat layers and central thermoformable foam layers are widely utilized in manufacturing vehicle trim panels such as headliners. The foam layer provides formability and strength to the overall trim panel. The fibers provide sound insulation and additional strength. These panels are widely utilized and have proven successful in achieving functional goals for vehicle trim panels.

There are some concerns with this type of panel, however, due to the fibrous materials that have been utilized. The fibrous materials have almost always been fiberglass layers having small glass fibers embedded in a plastic binding layer. The fibers are exposed at the edges of the trim panel, and thus are handled by assemblers or eventual users of the vehicle. The handling of the glass fiber can cause skin irritation, and thus it is desirable to minimize contact between the glass fibers and any users.

In the prior art, covering edges have been proposed. The covering edges are not fully satisfactory since they are expensive and require additional post-manufacturing steps to be applied. Typically, the trim panels are cut to size from a larger panel, and the edge would then have to be placed on the final trim panel. Moreover, the covering edges are unsightly.

SUMMARY OF THE INVENTION

The instant invention utilizes natural fibrous materials in the fiber mat for a trim panel. In a preferred embodiment, a central thermoformable foam layer is provided with an outer fiber mat. An outer fabric trim layer is then placed on the mat. Appropriate adhesive layers secure the several panel layers together. In a most preferred embodiment, a second fibrous mat is placed on an opposed side of the foam layer. An outer scrim is then placed on the second fiber mat.

In preferred embodiments, the fibrous material may be hemp, or hemp derived materials. One most preferred material is abaca, a hemp derivative generally available from the Philippines. Other fibrous natural materials may be utilized, including sisal, flax, or other natural fibrous material. The natural material causes less skin irritation than the glass fibers, and thus overcomes the problems of the prior art.

In one proposed embodiment of this invention, the fibrous mat is provided by chopping or shredding the fibrous material into two to four inch pieces. A power resin binder is then melted on the fibrous material to secure the fibrous material at its intersecting points. The fibrous mat is then assembled into the trim panel as described above.

In a second type of fibrous mat, a paper-like size is first achieved for the fibrous material. That is, it is chopped to very fine sizes. A slurry is then formed with the fibrous material, a liquid and a cellulose binder. The binder attaches the fibers at intersecting points as in the previous embodiment.

The inventive trim panel thus provides all of the benefits of the fiber layers in the prior art, while eliminating the undesirable skin irritation and other problems due to the glass fibers.

These and other features of the present invention will be best understood from the following specification and drawings, of which the following is a brief description.

BRIEF DESCRIPTION OF THE DRAWINGS

FIG. 1 shows a trim panel made from the inventive material.

FIG. 2 is a cross-sectional view through the inventive trim panel.

FIG. 3 is an enlarged illustration of one portion of a layer in the inventive trim panel.

FIG. 4 shows a portion of an alternative embodiment.

DETAILED DESCRIPTION OF A PREFERRED EMBODIMENT

FIG. 1 shows a vehicle trim panel 20, which may be a vehicle headliner. Although the invention is specifically disclosed with reference to a headliner, other vehicle trim panels such as door panels, etc. may also be formed with the inventive material.

As shown in FIG. 2, the trim panel 20 comprises a decorative fabric or foam outer layer 22. A natural fiber mat 24 is positioned between this decorative layer 22 and a central foam layer 26. A second natural fiber mat 28 is placed on an opposed side of foam layer 26, and an outer impervious scrim 30 is then placed outwardly of the natural fiber mat 28. Appropriate adhesives 32, 34 and 36 secure the fibrous mat to the fabric and to the foam layer.

The inventive aspect of this invention are essentially drawn to the natural fiber mat layers 24 and 28. The other layers i may be as known in the prior art.

In one preferred embodiment, the decorative layer 22 may be a knit fabric with a thin urethane foam laminated to one side. Alternatively, a needled non-woven fiber may be used. The decorative layer is known in the art, and as mentioned above, forms no portion of this invention. The foam layer 26 may be any thermoformable foam such as a polyester blend or a semi-rigid urethane foam. The scrim layer 30 may be a polyester or rayon non-woven material with some surface treatment to prevent air or liquid transfer. The adhesive layer 32 and 34 are both preferably thermosetting adhesives such as cross-linking urethane or isocyanurate. The adhesive layer 36 may be an adhesive film such as a hot melt polyolefin or polyamide. All of the layers disclosed to this point are as known in the prior art.

The invention utilizes a natural fiber mat for layers 24 and 26. The mat may be composed of one to four inch pieces of hemp, or hemp derivatives such as abaca. Alternatively, sisal, flax, or other fibrous natural materials may be used. In the embodiment shown in FIG. 3, the fibers 38 are secured at their intersections 40 with a hot melt powder binder of polyamide or polyester resin. Thus, the fibers would be chopped or shred into one to four inch pieces, and made into a mat by depositing the fiber resin on the pieces and then heating the fiber resin to secure the fiber pieces at their intersections. In one preferred embodiment, the layer would be approximately one half millimeter to one millimeter thick. The layer is preferably 40–100 grams/$M^2$, and most preferably 80–85 grams/$M_2$.

This mat was manufactured by Astechnologies (of Jasper, Ga.).

In a second embodiment disclosed in FIG. 4, tile layers include much finer fibers 42 formed to with a binder 44 which is preferably a celluloustic binder. That is, the binder itself would also be a naturally occurring binder. The binder, finely chopped fibers, and preferably a liquid such as water are formed into a slurry and the mat is then formed to be very thin. The mat is typically on the order of a quarter of a millimeter. This mat preferably has a weight of 40–100 grams/$M^2$, and most preferably 80–85 grams/$M^2$. The celluloustic binder may be wood pulp.

This mat was manufactured by A.B. Fiberduk (of Ystad, Sweden).

Although specific natural fibers are disclosed for use in the natural fiber mats, other fibers are within the scope of this invention. In forming the inventive trim panel, the several layers are first individually formed. That is, the natural fiber mat is first formed to include its fibers and binder. Layers are then assembled in place. The finished trim panel 20 is formed by first placing the sandwich of layers into a heated mold which is preferably at 250–325°. The sandwich is then compression molded until the adhesives are all fully reacted. This part is then placed into a cooling fixture of the same molded shape until it has cooled to 90–120°. The part is then trimmed to its final shape by conventional means and packaged for delivery.

Since only natural fibers are utilized, there are no exposed skin irritating glass fibers once the part has been trimmed. The finished trim panel can be varied in strength and acoustic performance based on the weight of the natural fiber mat reinforcement and the thickness of the foam core. The thicker the foam or the higher the weight of the natural fiber mat used, the stronger the part and the better sound absorption characteristics will be.

A preferred embodiment of this invention has been disclosed, however, a worker of ordinary skill in the art would recognize that certain modifications would come within the scope of this invention. Thus, the following claims should be studied to determine the true scope and content of this invention.

We claim:

1. A vehicle trim panel comprising:

an outer decorative layer;

an inner layer;

fibrous mats positioned between said decorative layer and said inner layer, and on the opposed side of said inner layer, said fibrous mats being formed to include pieces of naturally occurring fibrous material, and a binder to secure said fiber pieces.

2. A trim panel as recited in claim 1, wherein an outer scrim is placed on said second fibrous mat on an opposed face from said inner layer.

3. A trim panel as recited in claim 1, wherein said naturally occurring fibrous material is a hemp.

4. A trim panel as recited in claim 1, wherein said naturally occurring fibrous material is abaca.

5. A trim panel as recited in claim 1, wherein said naturally occurring fibrous mat is formed from fiber pieces generally falling in a range of one to four inches in length, and having a fine powder binder included to secure said fiber pieces.

6. A trim panel as recited in claim 5, wherein said binder is a plastic binder.

7. A trim panel as recited in claim 1, wherein said fiber pieces are initially formed into a slurry of very small sized pieces along with a binder to form said fibrous mat.

8. A trim panel as recited in claim 7, wherein said binder is a cellulosic binder.

9. A trim panel as recited in claim 1, wherein said trim panel is a headliner.

* * * * *